United States Patent [19]

Katagiri et al.

[11] Patent Number: 4,757,195
[45] Date of Patent: Jul. 12, 1988

[54] OPTICAL PRESSURE SENSOR WITH PEDESTAL MOUNTED PHOTOELASTIC ELEMENT

[75] Inventors: Masayuki Katagiri, Nara; Masanori Watanaba, Tenri; Masaya Hijikigawa, Yamatokoriyama, all of Japan

[73] Assignee: Sharp Kabushiki Kaisha, Osaka, Japan

[21] Appl. No.: 878,656

[22] Filed: Jun. 26, 1986

[30] Foreign Application Priority Data

Jun. 27, 1985 [JP] Japan .................................. 60-141979

[51] Int. Cl.⁴ .............................................. G01D 5/34
[52] U.S. Cl. .................................. 250/231 P; 250/227; 73/705
[58] Field of Search .................. 73/705; 350/371, 372, 350/373; 250/231 P, 227

[56] References Cited

U.S. PATENT DOCUMENTS 3,203,229 8/1965 Pevar .
4,368,645 1/1983 Glenn et al. .
4,421,979 12/1983 Asawa et al. .
4,593,701 6/1986 Kobayashi et al. ................... 73/705

FOREIGN PATENT DOCUMENTS 2085155 4/1982 United Kingdom .

OTHER PUBLICATIONS

Patents Abstracts of Japan, P-202, Jun. 7, 1983, vol. 7/No. 130.

Primary Examiner—David C. Nelms
Assistant Examiner—Michael Messinger
Attorney, Agent, or Firm—Birch, Stewart, Kolasch & Birch

[57] ABSTRACT

A photoelastic element having reduced internal stress comprising a photoelastic material member; pedestal means; and a pair of supporting members integrally formed with the pedestal means for supporting the photoelastic material member, one of said pair of supporting members being adhered or bound to the photoelastic material member, and the other of said pair of supporting members being in contact with the photoelastic material member without being bound thereto.

6 Claims, 2 Drawing Sheets

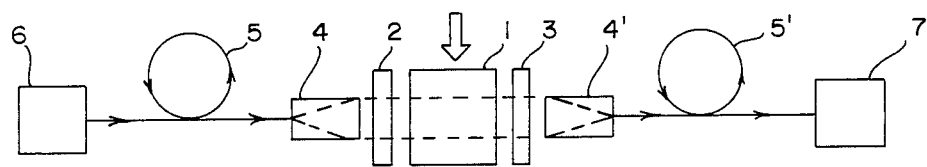
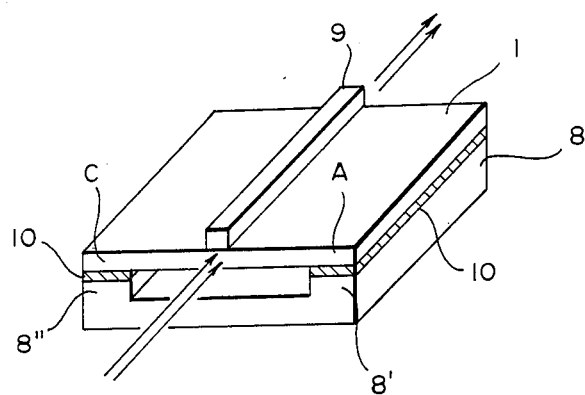
FIG. 2
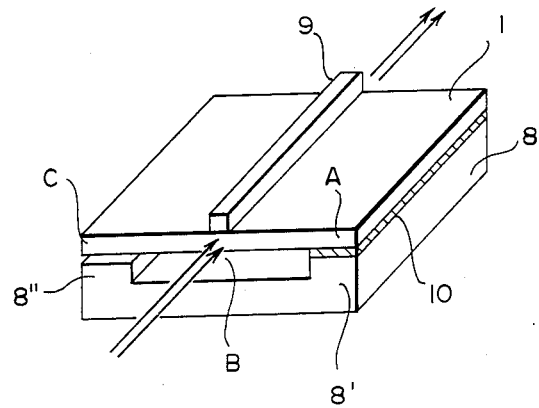
FIG. 3

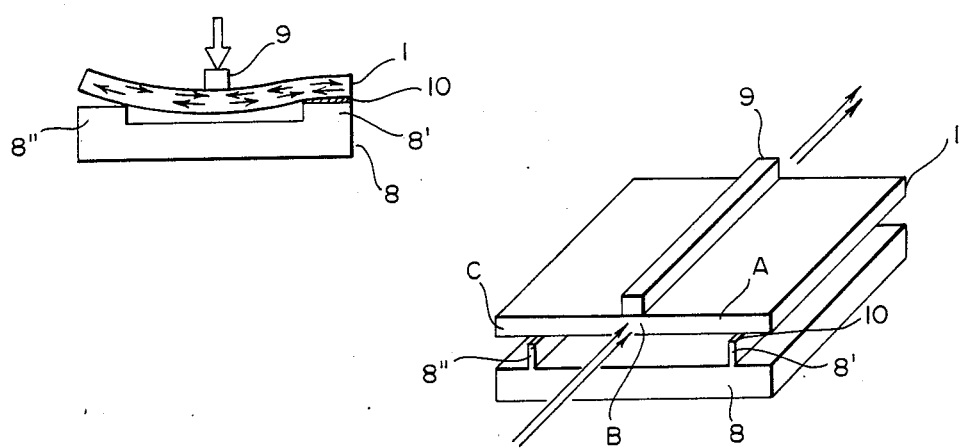
FIG. 4
FIG. 5
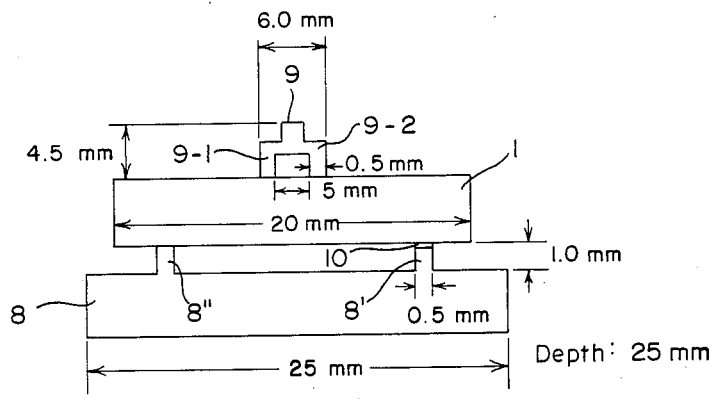
FIG. 6
FIG. 7
FIG. 8

OPTICAL PRESSURE SENSOR WITH PEDESTAL MOUNTED PHOTOELASTIC ELEMENT

BACKGROUND OF THE INVENTION

The present invention relates to an optical sensor and, more particularly, to an optical pressure sensor comprising a photoelastic material.

In a conventional optical pressure sensor using a photoelastic material, since the photoelastic material is fixed on a pedestal by an adhesive material or a binder, so that the portions of the photoelastic material in contact with the pedestal are tightly secureed on the pedestal, internal stress may be produced from the portions of the photoelastic material adhered to or bound on the pedestal when the adhesive or the binder is hardened. After the adhesive or the binder hardens, the internal stress remains in the connections between the photoelastic material and the pedestal. The internal stress widely deflects detecting characteristics of a pressure. If the coefficient of thermal expansion in the photoelastic material is not equal to that of the pedestal in an operational temperature range, the difference between the coefficients of thermal expansion in the photoelastic material and the perdestal causes another internal stress and thereby causes a change in the quantity of passing light. Further, when a load is applied to the photoelastic material, the stress may be concentrated upon the connection portions between the photoelastic material and the pedestal, in addition to the pressing position, so that the pressure sensitivity may be decreased.

SUMMARY OF THE INVENTION

Accordingly, it is an object of the present invention to provide an improved optical sensor which shows high reliability and high sensitivity.

It is another object of the present invention to provide an improved optical pressure sensor which prevents detection accuracy from being decreased by reducing internal stress which will inevitably be produced in a photoelastic material.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, a photoelastic element is provided which comprises a photoelastic material member, pedestal means for disposing the photoelastic material member thereon, and a pair of first and second supporting members integrally provided with the pedestal means for supporting the photoelastic material member, either one of the first supporting member or the second supporting member being adhered or binded to the photoelastic material member, and the remaining one of the first supporting member and the second supporting member being in contact with the photoelastic material member without any adherence and any bind.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 shows a fundamental construction of an optical pressure sensing system using a photoelastic material;

FIG. 2 shows a perspective view of a basic optical pressure sensor used in comparison with the present invention;

FIG. 3 shows a perspective view of an optical pressure sensor according to an embodiment of the present invention;

FIG. 4 shows the condition of the photoelastic material when pressed from the outside;

FIG. 5 shows a perspective view of an optical pressure sensor according to another embodiment of the present invention;

FIG. 6 shows a sectional view of an optical pressure sensor according to still another embodiment of the present invention;

FIG. 7 shows a sectional view of the optical pressure sensor of FIG. 2; and

FIG. 8 shows a sectional view of the optical pressure sensor according to the present invention.

DETAILED DESCRIPTION OF THE PREFERRED EMBODIMENTS

FIG. 1 shows a fundamental construction of an optical pressure sensing system using a photoelastic material. A photoelastic material 1 is provided between a polarizer 2 and an analyzer 3. Light from a light source 6 is introduced into a micro-lens 4 through an optical fiber 5. The micro-lens 4 collimates the light. The collimated light is passed through the polarizer 2 to convert the collimated light into linear-polarized light. The optical axis of the polarizer 2 is inclined about 45 degrees against the pressing direction. The liner-polarized light is applied to the photoelastic material 1. After passing through the photoelastic material 1, a micro-lens 4' collimates light introduced through the analyzer 3. The collimated light is introduced to a photo-detector 7 through an optical fiber 5'. The photoelastic material 1 causes the light to show a double-refraction by applying stress from the outside. When the light is passed through the photoelastic material 1, a phase difference occurs between the direction in which pressure is applied and a direction perpendicular to the direction applying the pressure, so that linearly polarized light is converted into elliptically polarized light. When the elliptically polarized light is passed through the analyzer 3 having an optical axis perpendicular to the optical axis of the polarizer 2, the light intensity is changed according to the pressure from the outside. On the above principle, it is possible to make a pressure sensor, a load sensor, an acceleration sensor, a vibration sensor, an acoustic sensor, etc.

FIG. 2 shows a perspective view of a basic optical pressure sensor used in comparison with the present invention. To increases sensitivity, the sensor is a bending type sensor. A photoelastic material 1 is fixed on a pedestal 8. The pressure to be measured is applied to the photoelastic material 1 through a pressing member 9. In this case, compression stress occurs at the upper portion of the photoelastic material 1, and tension stress occurs at the lower portion of the photoelastic material 1 near to the pedestal 8. If linearly polarized light penetrates either the upper portion of the photoelastic material 1 or the lower portion of the photoelastic material 1, the elliptically polarized light is emitted from the photoelastic material 1. As described above, when the photoelastic material 1 is disposed between the polarizer 2 and the analyzer 3, the quantity of light penetrating the photoelastic material 1 is varied.

In FIG. 2, the photoelastic material 1, preferably, is formed with a flat configuration. The pressing member 9 is disposed on a substantially center portion of the photoelastic material 1, and is formed a as rectangular solid. The pedestal 8 is formed in a "U" shaped configuration and has a pair of supporting walls 8' and 8". The photoelastic material 1 is fixed on the pedestal 8 by an adhesive or binder 10 so that the side portions of the lower surface of the photoelastic material 1 in contact with the supporting walls 8' and 8" of the pedestal 8 are adhered or bound on the supporting walls 8' and 8" of the pedestal 8. Although the pressure can be detected by the above sensor, high reliability and high sensitivity cannot be expected.

To resolve the above problem, the following embodiment of the present invention has been developed.

In the embodiment of the present invention as shown in FIG. 3, the optical pressure sensing system is shown in FIG. 1 is utilized. The photoelastic material 1 is provided between the polarizer 2 and the analyzer 3. The polarizer 2 and the analyzer 3 are connected to the optical fiber 5 at the input side and the optical fiber 5' at the output side via the micro-lenses 4 and 4', respectively. The optical fiber 4 at the input side is connected to the light source 6, and the optical fiber 4' at the output side is connected to the photo-detector 7.

The optical sensor comprises a photoelastic material 1, a pedestal 8, and a pressing member 9. The photoelastic material 1, preferably, is formed in a flat configuration, and the pedestal 8 is formed with a "U" shaped configuration (or the concave form) having a pair of supporting walls 8' and 8". The photoelastic material 1 is provided on the supporting walls 8' and 8" of the pedestal 8, thereby being in parallel with the optical axis. The photoelastic material 1 is adhered to or bound on either the supporting wall 8' or the supporting wall 8" by the adhesive or binder 10. Only one of both sides of a lower surface of the photoelastic material 1 is fixed on one of the supporting walls of the pedestal by the adhesive or the binder. The other side of the lower surface of the photoelastic material 1 is not adhered to or bound to the remaining one of the supporting walls of the pedestal. In FIG. 3, the side A of the lower surface of the photoelastic material 1 is fixed on the supporting wall 8' of the pedestal 8 by the adhesive or the binder 10. The other side C of the lower surface of the photoelastic material 1 is not adhered or bound on the other supporting wall 8" of the pedestal 8. In other words, the other side C of the lower surface of the photoelastic material 1 contacts the other supporting wall 8" of the pedestal 8 without any adherance or binding. The internal stress occurs at the end portion A because the end portion A of the photoelastic material 1 is adhered or bound on the supporting wall 8' of the pedestal 8. No internal stress occurs at the other end portion C because it is separated from the supporting wall 8" of the pedestal 8. Accordingly, the internal stress at the end portion A does not influence the center portion B of both surfaces of the photoelastic material 1 through which light penetrates. Therefore, the optical characteristic is not changed so much by adherence or bonding between the photoelastic material 1 and the pedestal 8. In the temperature characteristic, even when the coefficient of thermal expansion in the photoelastic material 1 is different from the coefficient of thermal expansion in the pedestal 8, the internal stress caused by the temperature variations occurs at only the end portion A of the lower surface of the photoelastic material 1. Therefore, the central portion B of the photoelastic material 1 is not influenced by the internal stress at the end portion A. Thus quantity of light is not changed very much by the temperature variation.

The light from the light source 6 through the optical fiber 5 and the micro-lens 4 is applied to the polarizer 2 so that the incident light is converted into linear polarized light. The linearly polarized light penetrates the center portion B of the photoelastic material 1 under the pressing member 9. In this step, if the photoelastic material 1 receives the stress from the outside through the pressing member 9, the linear polarized light is double-refracted according to the intensity of the stress and converts into elliptical polarized light based on the photoelastic effect. The elliptical polarized light is outputed from the photoelastic material 1 and introduced into the analyzer 3.

In the above embodiment, the condition of the photoelastic material when pressed is shown in FIG. 4. The distribution of the internal stress in the photoelastic material 1 is indicated by arrows. Compression stress and tension stress are produced in the phtoelastic material 1. As the adhered or bound area between the photoelastic material 1 and the pedestal 8 becomes broader, the stress distribution becomes nonuniform. It is disadvantage that the sensitivity of the sensor is varied according to the adhered or bound condition of the photoelastic material.

FIG. 5 shows a perspective view of an optical sensor according to another embodiment of the present invention. The optical sensor comprises a photoelastic material 1, a pedestal 8 integrally having a pair of supporting walls 8' and 8", and a pressing member 9. The lower surface of the photoelastic material 1 is adhered or bound on the supporting wall 8' of the pedestal 8 but is not adhered or bound on the supporting wall 8". The lower surface of the photoelastic material 1 contacts the supporting wall 8" without any adherence or bonding means. The pressure (stress) from the outside is applied to the photoelastic material 1 via the pressing member 9. If the light penetrates the photoelastic material 1 when the pressure is applied to the photoelastic material 1, the light is double-refracted by the photoelastic material 1, and the amount of the transmitted beam is changed according to the strength of the pressure.

The width of each of the supporting walls 8' and 8" is narrow where they contact the photoelastic material 1. Therefore, the adhered or bound area between the photoelastic material 1 and the pedestal 8 is narrower than that of the optical sensor of FIG. 3. The nonuniformity of the stress distribution can be reduced, but the sensitivity can not be decreased. The high reproducibility can be obtained.

The photoelastic material 1 is selected from polymer resins, or glass. The glass photoelastic material is silica glass, crown glass, etc. The polymer photoelastic material is an epoxy resin, a diallyl phthalate (DAP) resin, and the like. The photoelastic material may be GaP, $LiNbO_3$, $LiTaO_3$, ZnSe, an acrylic resin, a polycarbonate resin and a silicon resin. The material of the pedestal 8 is Invar (35.5% Ni:Fe), Fe-Ni alloy, brass, polymer, etc. The adhesive or binder may be a low melting point glass, an epoxy resin, a silicone resin, an inorganic adhesive or binder such as silica cement, or the like.

When silica glass is used as the photoelastic material, Inver may be preferred as the pedestal. When crown glass is used as the phototelastic material, Fe-Ni alloy may be preferred as the pedestal. When an epoxy resin or DAP is used as the photoelastic material, brass or a polymer may be preferred as the pedestal.

Although the photoelastic material 1 and the pedestal 8 are adhered or bound to each other, the part of the photoelastic material 1 may be sandwiched from the the upper and the lower directions.

In the present invention, the photoelastic material converts the incident light from linearly polarized light to the elliptically polarized light according to the strength of the stress (pressure) from the outside. The optical axis of the analyzer disposed at the output port of the photoelastic material is perpendicular to the optical axis of the polarizer disposed at the input port of the photoelastic material. Therefore, the quantity of light passing through the analyzer 3 is changed according to the amount of the ellipitically polarized light. The quantity of light is detected by the photo-detector. By calculating the intensity of the received light at the photo-detector against the intensity of light emitted from the light source, the pressure from the outside can be detected.

FIG. 6 shows a sectional view of an optical sensor according to still another embodiment of the present invention. In this example, silica glass is used as the photoelastic material 1, and Inver is used as the pedestal 8. The supporting walls 8' and 8" are integrally provided on the pedestal 8 to form a concave section. The photoelastic material 1 preferably has a flat configuration. The pressing member 9 comprises pressing legs 9-1 and 9-2 forming a cavity, and a pressing portion 9-3 connected to the pressing legs 9-1 and 9-2. The size of each of the photoelastic material 1, the pedestal 8 and the pressing member 9 is as follows. The width of the pedestal 8 is about 25 mm, the width of each of the supporting walls 8' and 8" is about 0.5 mm, the height of the supporting walls 8' and 8" is about 1 mm, and the depth of the pedestal 8 is about 25 mm. The width and the depth of the photoelastic material 1 are about 20 mm and about 25 mm, respectively. The width, height, depth of the pressing member 9 are about 6 mm, and about 4.5 mm, and 25 mm. The wall thickness of the pressing member 9 is about 0.5 mm. The photoelastic material 1 is adhered or binded on either the supporting wall 8' or the supporting wall 8" by the adhesive or binder 10. The photoelastic material 1 is in contact with the remaining one of the supporting walls 8' and 8" of the pedestal 8 without any adherance or any bond. The photoelastic material 1 is pressed by two pressing legs 9-1 and 9-2 of the pressing member 9 by the pressure from the outside. In FIG. 6, the photoelastic material 1 is adhered or bound on the supporting wall 8'.

In case where silica glass is used as the photoelastic material 1 and Inver is used as the pedestal 8, the quantity of transmitted light is as follows for comparision when the both sides of the lower surface of the photoelastic material 1 are adhered or bound on the supporting walls 8' and 8" of the pedestal 8, respectively, as shown in FIG. 7, and when one of the both sides of the lower surface of the photoelastic material 1 is adhered or bound on one of the supporting walls 8' and 8" of the pedestal 8 as shown in FIG. 8.

(When both sides of the lower surface of the photoelastic material 1 are adhered or bound on the supporting walls 8' and 8")

|  | point a | point b | point c |
| --- | --- | --- | --- |
| before the adherence or the bind | −53.2 | −54.71 | −57.9 |
| after the adherence or the bind | −29.17 | −29.45 | −32.4 |

(When only one side of the lower surface of the photoelastic material 1 is adhered or bound on one of the supporting walls 8' and 8")

|  | point d | point e |
| --- | --- | --- |
| Sample I |  |  |
| before the adherence or bonding | −50.3 | −53.0 |
| after adherence or bonding | −51.6 | −50.2 |
| Sample II |  |  |
| before adherence or bonding | −51.8 | −52.9 |
| after the adherence or bonding | −49.8 | −46.8 |

A unit is dBm (0 dBm=1 μW, −10 dBm=0.1 μW, and −20 dBm=0.01 μW). When both sides of the lower surface of the photoelastic material 1 are adhered or bound on the supporting walls 8' and 8" of the pedestal 8, respectively, by the adhesive or the binder 10, the transmitted beam amount after adherence or bonding becomes greater than that before adhering or binding, because of the internal stress in the photoelastic material. On the contrary, when only one side of the lower surface of the photoelasti material 1 is adhered or bonded on one of the supporting walls 8' and 8" according to the present invention, the quantity of transmitted light after adhereing or bonding is substantially equal to that before adhearing or binding. Accordingly, internal stress is not produced in the photoelastic material 1 by adhering or binding.

In the sensor comprising BACD-11 (glass) as the photoelastic material 1, NS-5 (metal) as the pedestal 8, and LS-0803 (low melting glass) as the adhesive or the binder 10, when the temperature is varied, the quantity of transmitted light is as follows.

(When both sides of the lower surface of the photoelastic material 1 are adhered or bound on the supporting walls 8' and 8")

| Temperature | Quantity of transmitted light |
| --- | --- |
| 27 degrees C. | 66.6 nW |
| 60 degrees C. | 91.8 nW |

(When only one side of the lower surface of the photoelastic material 1 is adhered or bound on one of the supporting walls 8' and 8")

| Temperature | Quantity of transmitted light |
| --- | --- |
| 26 degrees C. | 13.6 nW |
| 60 degrees C. | 13.7 nW |

When both sides of the lower surface of the photoelastic material 1 are adhered or bound on the supporting walls 8' and 8", respectively, the quantity of transmitted light is remarkably changed by the variations in the temperature.

As described above, in the present invention, it is believed that the internal stress does not remain in the photoelastic material. The variations of the detecting characteristics can be reduced. The selections of materials of the photoelastic material and the pedestal can not be considered in terms of the coefficient of thermal expansion, and the material of the pedestal is freely selected. The detection sensitivity of the sensor is not decreased because the quantity of light is not influenced by the temperature variation.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A photoelastic element having reduced internal stress comprising:
    a photoelastic material member;
    pedestal means; and
    a pair of supporting members integrally formed with the pedestal means for supporting the photoelastic material member, one of said pair of supporting members being adhered or bound to the photoelastic material member, and the other of said pair of supporting members being in contact with the photoelastic material member without being bound thereto.

2. The photoelastic element of claim 1, wherein a pressing member is provided on the photoelastic material member for receiving pressure from the outside.

3. The photoelastic element of claim 1, wherein the pair of supporting members and the photoelastic material member form a cavity therebetween.

4. The photoelastic element of claim 1, wherein light penetrates the substantially center portion between the area where the photoelastic material member is adhered or bound on the supporting member and the area where the photoelastic material member is in contact with the supporting member.

5. The photoelastic material element of claim 1, wherein a pressing member is provided on the portion of the photoelastic material member through which light penetrates.

6. An optical sensor system having reduced internal stress comprising:
    a light source for outputting light;
    a first optical fiber connected to the light source for transmitting the light;
    a micro-lens for receiving and collimating the light from the first optical fiber;
    a polarizer for converting the light from the micro-lens into linearly polarized light;
    a photoelastic element for converting the lineraly polarized light into elliptically polarized light when a pressure from the outside is applied thereto, said photoelastic element comprising a photoelastic material member, pedestal means, and a pair of supporting members integrally formed with the pedestal means for supporting the photoelastic material member, one of said pair of supporting members being adhered or bound to the photoelastic material member, and the other of said pair supporting members being in contact with the photoelastic material member without being bound thereto,
    a analyzer for receiving the elliptically polarized light and outputting analyzed light;
    a second micro-lens for collimating the analyzed light from the analyzer;
    a second optical fiber for transmitting the collimated light from the micro-lens; and
    a photo-detector for detecting the light through the second optical fiber to determine the quantity of light.

* * * * *